United States Patent Office 2,800,769
Patented July 30, 1957

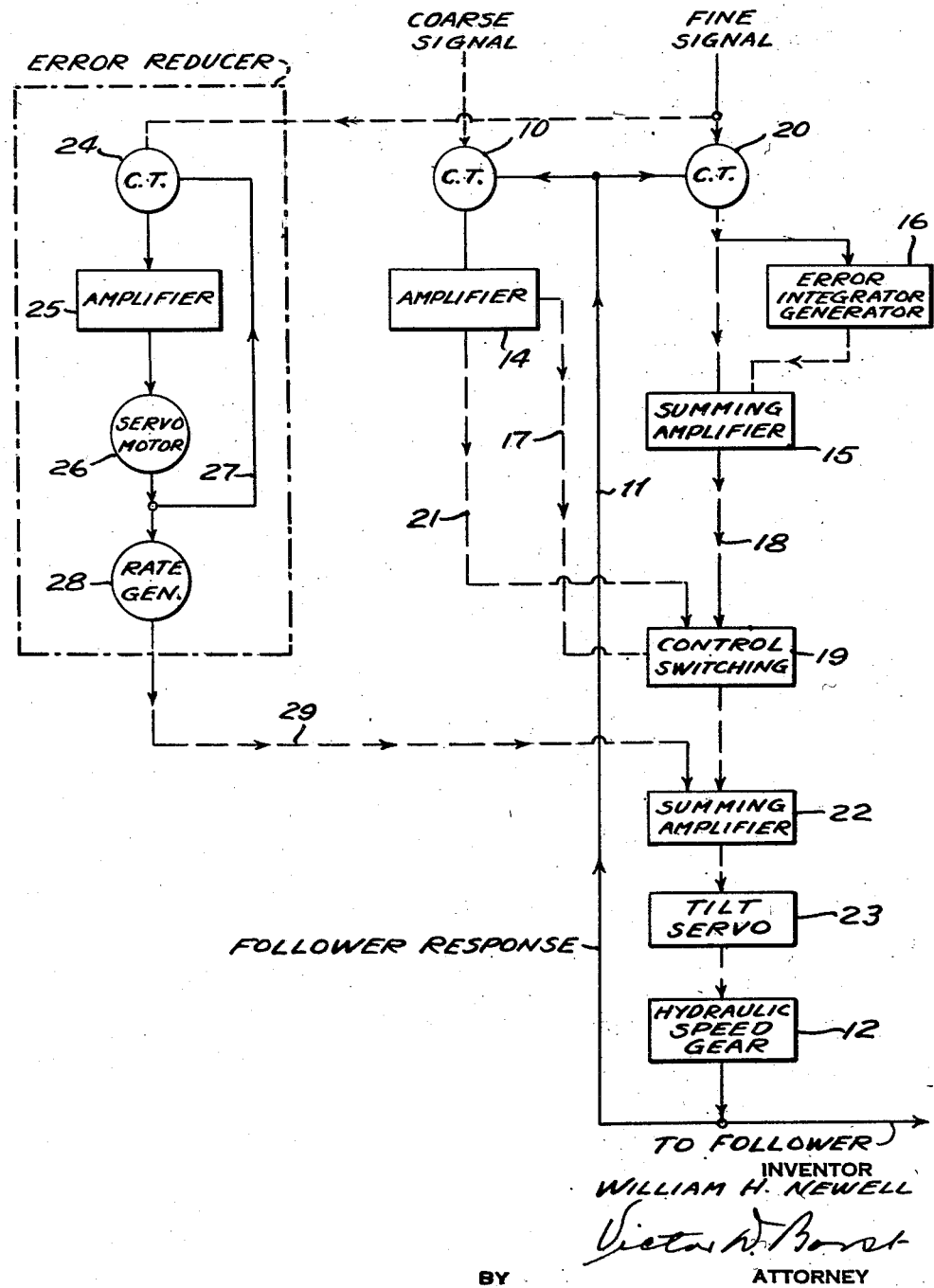

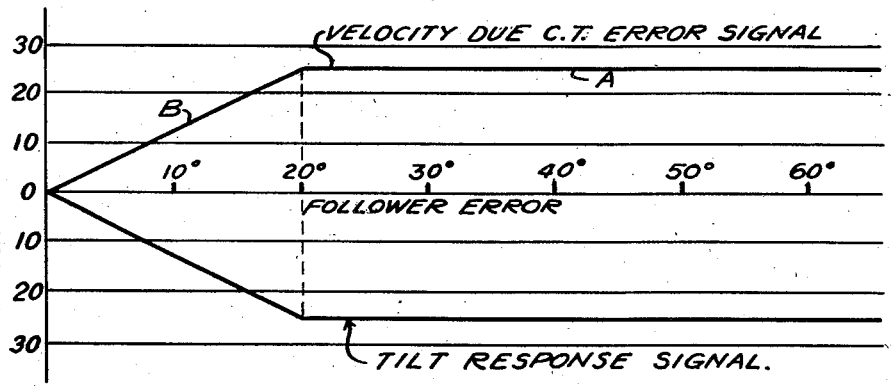
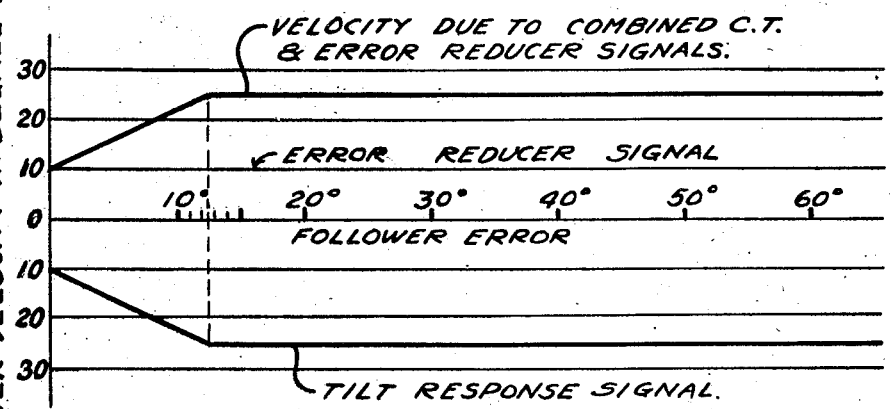

2,800,769
FINE AND COARSE CONTROL

William H. Newell, Mount Vernon, N. Y., assignor to The Sperry Corporation-Ford Instrument Company Division, Long Island City, N. Y., a corporation of Delaware Application May 4, 1954, Serial No. 427,441

6 Claims. (Cl. 60—52)

This invention relates to means for causing a driven member to follow or reproduce the movement of an initiating or signal member, and more especially to means for bringing such a follower into synchronizing agreement with a moving signal member.

Among the principal objects which the invention seeks to accomplish is the shortening of the time for bringing the follower into synchronization with the signal and the avoidance of overrun and the effecting of smoother synchronization than has heretofore been attainable.

Another important object of the invention is simplicity and high degree of accuracy in performance and in the measurement of quantities employed in the control.

While the invention has general utility in the reproduction of motion, it has been especially designed for use in gun fire control in the synchronizing of guns with a signal produced by a sighting device in training upon and following a target. This invention contemplates the incorporation and use in the synchronizing control of a factor termed herein and known to those working in the art as error reducer, that is, a quantity proportional to the signal rate.

The problem to which this invention is directed is emphasized in connection with fine and coarse control systems. In such systems ordinarily the coarse control has maintained maximum speed of the follow-up member until the error is reduced to some arbitrary amount, usually 2½°, when the fine control takes over. The speed is then abruptly reduced to the signal speed within this remaining angle, resulting usually in overshoots because of the peculiar system constants needed for reducing dynamic errors.

In the copending application of William H. Newell, Serial No. 557,982, filed October 10, 1944, now Patent No. 2,763,988, issued September 25, 1956, there is disclosed the introduction of a control responsive to the signal rate in the case of a moving signal in addition to the control responsive to the positional disagreement or error. This was for the purpose of eliminating the lag inherent in the error responsive control and is embodied in a hydraulic mechanism in which through a pilot piston the error fed from a comparison differential operates to displace a quantity of hydraulic fluid proportional to the error and thus cause a corresponding tilt of the control member of a variable speed hydraulic gear. In accordance with the invention of said application there is a supplemental control responsive to the signal speed which effects a displacement of an additional volume of hydraulic fluid proportional to the signal of speed. The function of this so-called error reducer is to generate an expression of signal velocity which is applied to tilt the speed gear so that the resultant error which will be operated on by the main servo will be at a minimum.

It was found that with the introduction of the error reducer it became possible in connection with fine and coarse control systems to modify the system constants so that the overshoots were greatly reduced. The Newell Patent No. 2,405,046 describes means for obtaining synchronizing rates proportional to errors and for switching control from coarse to fine.

The present invention contemplates the obtaining of such proportionality in a fine and coarse control system but without the use of the special equipment described in that patent. Furthermore this invention contemplates the employment of the error reducer in connection with such a system.

In accordance with the invention the hydraulic synchronizing device of said application Serial No. 557,982 is replaced with an electrical synchronizing system. This system is operated by control transformers and allows synchronizing at maximum velocities until a predetermined error position is reached, after which the rate of synchronizing is proportional to the remaining positional error. This type of control achieves a decrease in the synchronizing times and produces a smooth decelerated approach to the synchronized position without the undesirable roughness and overrunning previously encountered.

The invention will now be described in connection with the accompanying drawings after which the invention will be pointed out in claims.

Fig. 1 is a block diagram of a system embodying the invention;

Fig. 2 is a graph showing a characteristic synchronizing curve when synchronizing to a fixed signal; and Fig. 3 is a graph showing a characteristic synchronizing curve when synchronizing to a 10° per second increasing signal.

For the purpose of illustration the invention will be described as applied to the synchronizing of a gun mount to a gun order signal.

The illustrated system utilizes electromechanical components in the control in lieu of the hydraulic components of said application, and specifically it uses control transformers to receive the automatic gun order signals which, as is well known, act as differentials. The gun order signal is compared with the gun mount response in the control transformers and the output voltage therefore represents the error and is transmitted to the tilt servo the output of which is proportional to the voltage received. The tilt servo operates to tilt the stroke rod of the hydraulic speed gear.

The illustrated system has a coarse control transformer 10 and a fine control transformer 20. The mechanical response 11 of the hydraulic speed gear 12 is fed back to control transformers 10 and 20. The comparison or error output of control transformer 10 is transmitted to amplifier 14 and the error output of control transformer 20 is transmitted to amplifier 15 which is a summing or combining amplifier and to error integrator 16 the output of which is also transmitted to amplifier 15. This amplifier thus receives and combines the signal of error and the integral of error.

The coarse error signal output 17 from amplifier 14 and the modified fine error signal output 18 from amplifier 15 are transmitted to the control switching unit 19. This is a voltage sensitive relay and a control switching signal 21 is obtained from the coarse error amplifier 14 and the signal is used in the control switching unit 19 to determine whether the coarse error or fine error will be in control of the speed gear 12.

From the control switching unit the error voltage is transmitted to a summing amplifier 22 which also receives the voltage output of a rate generator of an error reducer, as will later appear. The output of amplifier 22 is transmitted to the tilt servo 23, the output of which, as above stated is proportional to the voltage received by it. This tilt servo controls the setting of the tilting box or stroke rod of the hydraulic gear and thus determines the direction and speed of response.

The control switching unit 19 will disconnect the fine error signal from the tilt servo and also connect the coarse error signal to the tilt servo when the gun error reaches a predetermined value, generally selected as approximately 2½° of arc, resulting in a control switching signal voltage large enough to require this switching of control.

The error reducer referred to is diagrammatically represented in the box so entitled in Fig. 1. It comprises a control transformer 24 which also receives the automatic gun order signal. Its output is transmitted to amplifier 25 and the amplified voltage from this amplifier is transmitted to a servomotor 26. The mechanical output of the servomotor 26 is fed back to control transformer 24, the connections of the control transformer being such that its output voltage is proportional to the signal velocity or rate. The servomotor 26 therefore is driven at a rate proportional to the signal rate and it is connected to drive an electric generator 28 which is termed a rate generator since its voltage output 29 is proportional to the gun order signal velocity.

This error reducer signal voltage 29 is transmitted to the summing amplifier 22, as diagrammatically indicated in Fig. 1, and combines with the error voltage being transmitted from the control switching unit 19 to determine the voltage controlling the tilt servo 23 and therefore the response speed of the speed gear.

As represented in Fig. 2 the coarse error voltage will be of a magnitude to tilt the servo at full stroke when the gun error reaches some selected value, shown as 20° of arc. That value is of course arbitrary and will be modified to suit conditions. The response speed curves of Figs. 2 and 3 indicate that the maximum response speed at full stroke is 25° per second although of course this is arbitrary and will depend upon the constants of the system.

From the above it is apparent that the combining of the error reducer voltage with the error voltage from the coarse control transformer 10 with a moving signal will advance or retard the point or degree of error at which the response changes from maximum speed to a controlled speed proportional to the amount of error. Whether the error reducer voltage advances or retards this point depends upon whether the signal is an increasing or decreasing signal.

By way of example, let it be assumed that the received gun order signal calls for the gun to be synchronized to a fixed signal and that there is a present error of 45°. The gun order signal indicating the error of 45° is received by the coarse control transformer 10 and the control switching unit 19 places the coarse channel in control of the tilt servo. The signal is also received by the error reducer control transformer 24 but since the signal speed is zero the servomotor response 27 immediately positions the control transformer to zero output and there is therefore no rate voltage generated.

The result is the condition illustrated in Fig. 2. The coarse error voltage 17 is of a magnitude to position the tilt servo to full speed which is maintained until the selected point, namely, an error of 20° is reached, when deceleration begins and the response is asymptotic, the output of the tilt servo becoming proportional to the received voltage which is proportional to the error. At 2½° of error the control switches from the coarse to the fine channel and synchronism is achieved smoothly and with no appreciable overshooting. In Fig. 2 the portion of the curve representing the condition of full speed is marked A and the portion representing deceleration into synchronism is marked B.

Fig. 3 represents the curve when synchronizing to a signal increasing at the rate of 10° per second. In this the error reducer voltage or signal is proportional to the signal rate and is added to the coarse signal error voltage in the summing amplifier 22 and modifies the response so as to allow the full speed of 25° per second to continue until the gun is nearer the signal. In the illustrated example this point where deceleration begins and from which the error decay is at a rate proportional to the error is at 12½°. At synchronism the gun moves with the signal at 10° per second and since there is no error voltage the response is wholly from the error reducer voltage.

With a decreasing signal the error reducer voltage will have the opposite effect causing the deceleration to start at a point of larger error than would be the case without the error reducer. For example, with a signal decreasing at the rate of 10° per second, the point of change would be 27½° of error. In other words, with a given maximum gun mount speed, the deceleration has to start farther from synchronizing position, when the signal is approaching the mount train angle than is the case when the signal is moving in the same direction as the mount.

It is apparent therefore that the described combination of the error reducer with the basic fine and coarse control permits the error reducer effect to be applied during synchronizing, resulting in smooth synchronization. Also the error reducer allows of longer operation under maximum speed and shortens the time required for synchronizing.

It is obvious that the invention is independent of the particular electromechanical components employed and that the illustrated system may be modified in various respects without departing from the scope of the invention as defined in the following claims.

What is claimed is:

1. Motion reproducing mechanism comprising a variable speed power device for driving a follower member, an electrical servo in control of the power device, the output of the servo being proportional to the voltage received, a control transformer connected to receive electrical signals representing motion to be reproduced by the follower member, means for delivering to the control transformer the response of the power device, means for delivering the output voltage of the control transformer to the servo, means for generating a voltage proportional to the velocity of said electrical signals and means for adding said voltage to the output voltage of the control transformer.

2. Motion reproducing mechanism as claimed in claim 1 in which the means for generating a voltage proportional to the velocity of said electrical signals comprises a second control transformer connected to receive said signals, a servomotor connected to receive the output of said second control transformer, means to deliver to the said second control transformer the mechanical output of said servomotor, and an electrical generator driven by said servomotor.

3. Motion reproducing mechanism as claimed in claim 2 in which there is a summing amplifier connected to said electrical servo and the voltage outputs of said first mentioned control transformer and of said generator are combined in said summing amplifier.

4. Motion reproducing mechanism comprising a variable speed hydraulic gear of the type having a tiltable member for controlling the direction and speed of the output of the gear, an electrical servo in control of the tiltable member, the output of the servo being proportional to the voltage received, a control transformer connected to receive electrical signals representing motion to be reproduced by the output of the hydraulic gear, means for delivering to the control transformer the said output of the hydraulic gear, means for amplifying the output of the control transformer, a second control transformer connected to receive said signals, an amplifier for the output of the second control transformer, a servomotor connected to the output of said last mentioned amplifier, means for delivering to the second control transformer the output of the said servomotor, an electrical generator driven by the said servomotor, a voltage summing member connected to the said electrical servo, and means to feed into the voltage summing member the amplified voltage output of the first mentioned control transformer and of the said electric generator.

5. Motion reproducing mechanism comprising a variable speed hydraulic gear of the type having a tiltable member for controlling the direction and speed of the output of the gear, an electrical servo in control of the tiltable member, the output of the servo being proportional to the voltage received, a coarse signal channel and a fine signal channel, each including a control transformer connected to receive electrical signals representing motion to be reproduced by the output of the hydraulic gear, means for delivering to both control transformers the output of the hydraulic gear, an amplifier connected to the output of each control transformer, a voltage summing member connected to the said electrical servo, a control switching device for selectively connecting the outputs of the coarse and fine circuit amplifiers to the voltage summing member, the said control switching device being responsive to the voltage output of the coarse circuit amplifier, means for generating a voltage proportional to the velocity of the said electrical signal, and means for conducting the said velocity proportional voltage to the said summing member.

6. Motion reproducing mechanism as claimed in claim 5 in which the means for generating a voltage proportional to the velocity of said electrical signals comprises a third control transformer connected to receive said signals, a servomotor connected to receive the output of said third control transformer, means to deliver to said third control transformer the output of said servomotor, and an electrical generator driven by said servomotor.

References Cited in the file of this patent

UNITED STATES PATENTS

| | | |
|---|---|---|
| 2,630,282 | Halpert | Mar. 3, 1953 |
| 2,648,041 | Perkins | Aug. 4, 1953 |
| 2,670,454 | Wilson | Feb. 23, 1954 |
| 2,698,407 | Pease | Dec. 28, 1954 |